United States Patent [19]

Hain, Jr.

[11] Patent Number: 4,473,838

[45] Date of Patent: Sep. 25, 1984

[54] DIGITAL COLOR GENERATOR

[75] Inventor: John A. Hain, Jr., Huntsville, Ala.

[73] Assignee: Central Dynamics Ltd., Pointe Claire, Canada

[21] Appl. No.: 434,510

[22] Filed: Oct. 15, 1982

[51] Int. Cl.³ .............................................. H04N 9/50
[52] U.S. Cl. ...................................................... 358/25
[58] Field of Search .................................... 358/24, 25

[56] References Cited

U.S. PATENT DOCUMENTS 4,003,078 1/1977 Owen .
4,040,086 8/1977 Wellhausen et al. .
4,051,520 9/1977 Davidse et al. .
4,329,710 5/1982 Taylor .

Primary Examiner—Richard Murray

Attorney, Agent, or Firm—Oblon, Fisher, Spivak, McClelland & Maier

[57] ABSTRACT

The invention relates to a sinusoidal subcarrier phase shifter for a television color generator. In accordance with the invention, the sinusoidal subcarrier is first converted to a corresponding rectangular wave. The pulse width of the rectangular wave is then varied in accordance with a signal of varying amplitude, the amplitude of the signal corresponding with the desired phase shift. The pulse width is varied by an arrangement consisting of interconnected one shot multivibrators and operational amplifiers. The rectangular wave form is then converted to a square wave, and the square wave is, in turn, converted to a phase shifted sinusoidal wave. The phase shifter for a PAL system consists of two channels, one of the channels producing one of the PAL phases and the other channel producing the complementary PAL phase.

15 Claims, 1 Drawing Figure

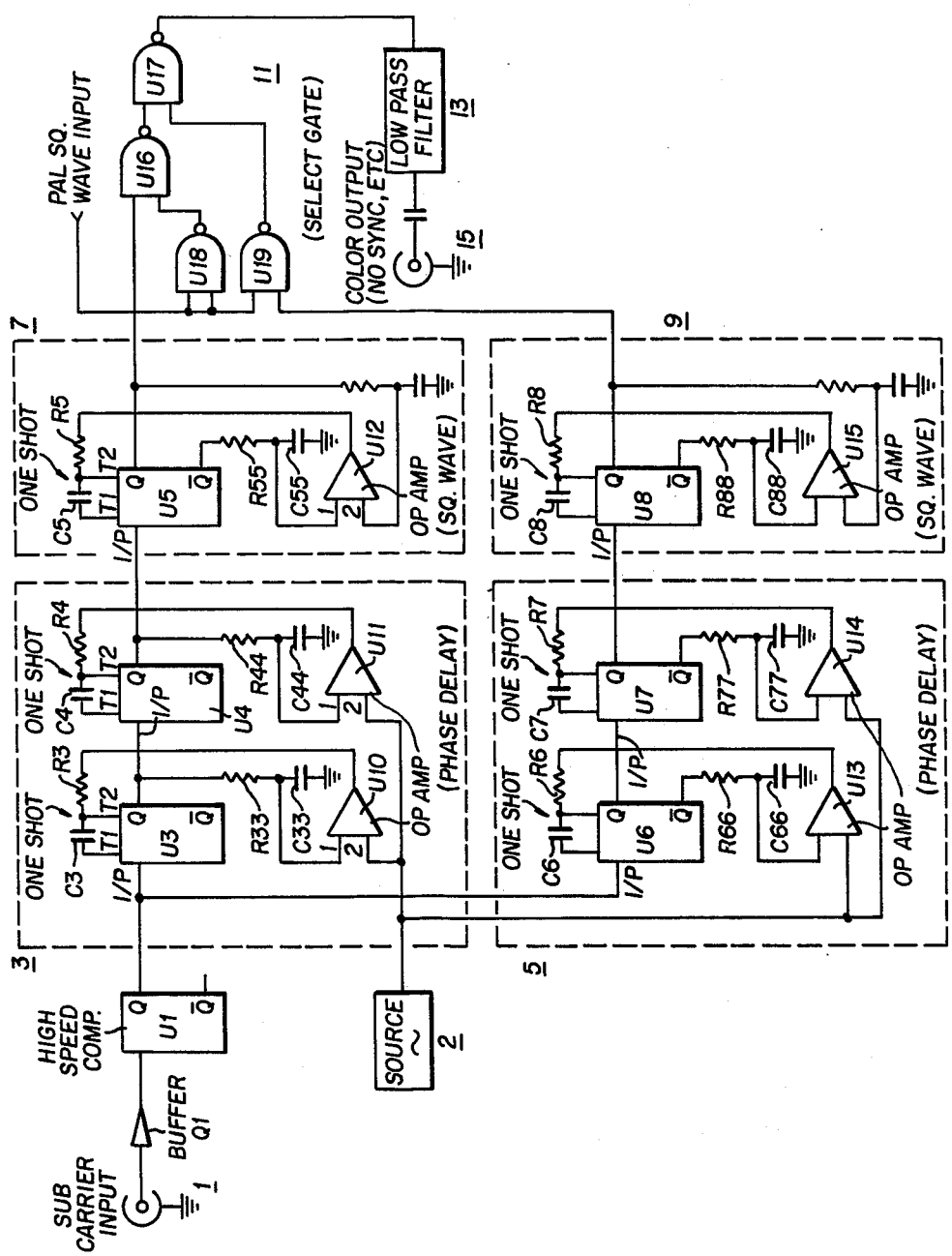

DIGITAL COLOR GENERATOR

BACKGROUND OF INVENTION (a) Field of the Invention

The invention relates to improvements to a television color generator. More specifically, the invention relates to a novel phase shifting circuit for such a color generator.

(b) Description of Prior Art

Systems for generating color signals for television are typically complex. For example, systems for generating a PAL color signal use balanced generators and sine/cosine generators. These systems have balance problems and therefore require many adjustments.

Other systems are also known in the prior art which is exemplified by, for example, U.S. Pat. No. 4,329,710, Taylor, issued May 11, 1982; U.S. Pat. No. 4,051,520, Davidse et al, issued Sept. 27, 1977; U.S. Pat. No. 4,040,086, Wellhausen et al, issued Aug. 2, 1977; and U.S. Pat. No. 4,003,078, Owen, issued Jan. 11, 1977. The '078 patent teaches an arrangement for providing time delay to a sub-carrier whereby to shift the phase of that sub-carrier. The arrangement uses a plurality of monostable vibrators. However, this circuit is an open loop arrangement. Because it is open loop, it could not accurately generate the two required phases for a PAL system. Although it might be possible to use the patented circuit in a PAL system with accuracy sacrificed, such an open loop approach would not be stable or easy to adjust.

SUMMARY OF INVENTION

It is therefore an object of the invention to provide an improved television color generator which includes a closed loop means for phase shifting a sub-carrier input.

It is a more specific object of the invention to provide such a means wherein the sub-carrier input is phase shifted in accordance with the magnitude of a signal of varying amplitude.

It is a still further object of the invention to provide such a means using a plurality of one-shot multivibrators interconnected with respective operational amplifiers.

In accordance with the invention there is provided, in a television color generator, means for phase shifting a sinusoidal sub-carrier input in accordance with a signal of varying amplitude. The phase shifter includes means for converting the sinusoidal input to a corresponding rectangular wave, means for providing the signal of varying amplitude, which amplitude varies in accordance with required phase shift, and means for varying the pulse width of the rectangular wave in accordance with the signal amplitude. The means for converting the sinusoidal input to a corresponding rectangular wave, and the means for providing a signal of varying amplitude, are connected to the means for varying the pulse width of the rectangular wave. Further provided are means for converting the rectangular wave to a square wave. The means for varying the pulse width is connected to the means for converting the rectangular wave to a square wave. Also provided are means for converting the square wave to a phase shifted sinusoidal wave, the means for converting the rectangular wave to a square wave being connected to the means for converting the square wave to a phase shifted sinusoidal wave. Whereby, the sinusoidal sub-carrier input is phase shifted in accordance with the amplitude of the signal of varying amplitude.

In accordance with a further embodiment of the invention there is provided, in a digital PAL/NTSC color generator, means for phase shifting a sinusoidal sub-carrier input in accordance with a signal of varying amplitude. The phase shifter includes means for converting the sinusoidal input to a corresponding rectangular wave, means for providing the signal of varying amplitude, which amplitude varies in accordance with required phase shift, and means for varying the pulse width of the rectangular wave in accordance with the signal amplitude, the means for varying consisting of a first channel for producing a first PAL phase and a second channel for producing a complementary PAL phase. The means for converting the sinusoidal input to a corresponding rectangular wave, and the means for providing a signal of varying amplitude, are connected to the means for varying the pulse width of said rectangular wave. Also provided are first and second means for converting the rectangular wave to a square wave, the first and second channels being connected to respective ones of the means for converting the rectangular wave to a square wave. PAL color phase select means are provided for alternately selecting output from the first channel and the second channel and having a first input and a second input. The first channel is connected to the first input of the color phase select means and the second channel is connected to the second input of the color phase select means. Means are also provided for converting the square wave to a phase shifted sinusoidal wave, the means for converting the rectangular wave to a square wave being connected to the means for converting the square wave to a phase shifted sinusoidal wave. Whereby the sinusoidal sub-carrier input is phase shifted in accordance with the amplitude of the signal of varying amplitude.

BRIEF DESCRIPTION OF DRAWING

The invention will be better understood by an examination of the following description together with the accompanying drawing which illustrates one embodiment of the phase shifter in accordance with the invention.

DESCRIPTION OF PREFERRED EMBODIMENT

The phase shifter illustrated in the drawing is particularly adapted to be useful for PAL/NTSC systems. Specifically, the system provides the two complementary phases as required in a PAL system. In order to provide a color generator for an NTSC system, it is necessary to use only one-half of the embodiment illustrated, so that, to convert the illustrated embodiment to NTSC use, half of the system is disabled as will be explained below. As will be appreciated, it is within the scope of the invention to provide a phase shifter which is useable only with NTSC systems as will also be discussed below.

Referring now to the drawing, a sinusoidal sub-carrier input is fed, through a jack, or other input means 1, to a buffer Q1 and subsequently to a high speed comparator U1. The function of the high speed comparator is to convert the sinusoidal wave to a corresponding rectangular wave. As the remainder of the phase shifter comprises in essence a plurality of multivibrators, it is apparent why the slow rise time sinusoid must be converted to a steep rise time rectangular wave.

The output of U1 is fed, in parallel, to two separate chains 3 and 5 for varying the pulse width of the rectangular waveform in accordance with a signal of varying amplitude from a source schematically illustrated at 2. The amplitude of the signal is related to desired phase shift.

As can be seen, the means 3 and 5 consist of one shot multivibrators connected in feedback arrangement with respective operational amplifiers. Considering the first such arrangement in the top channel 3, this consists of a one shot multivibrator U3 having an input terminal I/P, output terminals Q and $\overline{Q}$ and timing terminals $T_1$ and $T_2$. The output of U1 is fed to the input terminal I/P, and the Q terminal is connected, via RC network $R_{33}C_{33}$, to input 1 of the operational amplifier U10. Input 2 of the operational amplifier is fed from the source 2. The source 2 can constitute a potentiometer or other control means and the signal of varying amplitude is preferably a voltage of varying amplitude. The amplitude of this voltage will, as above-mentioned, correspond with the desired phase shift and will vary in accordance with HUE requirements.

The output U10 is fed, through a second RC network $R_3C_3$, to timing terminals $T_1$ and $T_2$ of the one shot U3.

The one shot and operational amplifier arrangement above-described constitutes a basic building block of the system, which are similarly referenced in the drawing, so that an understanding of this basic building block will now be provided. Simply, the circuit is a one shot whose pulse width is controlled by a closed loop feedback circuit. The operational amplifier compares two levels, one of which is provided from the Q output of the one shot and the other one of which is provided from source 2.

Since the output of a one shot is a variable duty cycle pulse, the average DC value is proportional to the width of the pulse. Therefore, filtering the output of the one shot through an RC network ($R_{33}C_{33}$) provides a DC voltage level proportional to the width of the pulse. This output is then compared to the voltage level at input 2, and the feedback will adjust the pulse width until the two DC's are equal. As can be seen, this is accomplished by feeding the output of the operational amplifier to the timing terminals of the one shot.

The arrangements U6,U13, U7,U14 operate in the reverse manner to the above arrangements. As mentioned, the feedback for each of the units is derived from the complement pulse output. Because of this, the inputs to the OP AMPS must be interchanged as shown in the drawing. This means that, as the voltage level is raised, the period decreases. Hence, the arrangements U6,U13, U7,U14, produce a phase complement to the phase produced by the arrangements U3,U10, U4,U11. The arrangement U8,U15 produces a square wave in the U6,U13, U7,U14 channel.

The pulse width output of the circuit can be varied only from the outside of the closed loop, i.e., only by changing the voltage level of source 2. Accordingly, only by changing this voltage level can the pulse width be varied.

The phase shift corresponding with different colors is provided in a two channeled arrangement for PAL systems. The first channel consists of the arrangement U3,U10, U4,U11 and U5,U12 while the second channel consists of the arrangements U6,U13, U7,U14, and U8,U15. As can be seen, each of these channels consists of three of the basic building blocks. However, the operational amplifiers of the third blocks are not connected to source 2. Instead, they are connected to the other outputs of their respective one shot multivibrators.

In addition, although in the first channel the feedback loop is from the Q terminal, in the second channel, the feedback loop is from the $\overline{Q}$ terminal. Thus, the phase of one phase shifted vector of the PAL system is adjusted in one channel and the phase of the other phase shifted vector of the PAL system is adjusted in the second channel. As also seen, in the U5,U12 arrangement, the second input of U12 is fed from the Q terminal of the one shot, and in a likewise manner, the second terminal of U15 in the U8,U15 arrangement is also fed from the Q terminal of U8. A varying voltage from a HUE control means (2) is fed to the second terminals of U10,U11, U13 and U14.

The method by which two color phases are generated from one single varying voltage is as follows:

The arrangements U3,U10, U4,U11 operate in the normal manner to give a positive phase delay. Since they are cascaded, the phase differences add. Both units are controlled by the same voltage, therefore, the output phase of the two units will be double that of a single unit.

The arrangement U5 and U12 makesup a square wave generator. As the input to terminal 2 of U12 is from the other output of the one shot, the duty cycle is forced to 50%. This is necessary as a square wave is needed to feed the low pass filter which will be discussed below.

The first channel makes up one of the PAL phases. The rotation of the color phase dot on the vectorscope for channel 1 is clockwise as the voltage level increases. The second channel makes up the reverse phase of the PAL system. This dot rotates counterclockwise on the vectorscope with an increase in voltage level.

Returning now to FIG. 1, NAND gates U16 through U19 comprise the color phase select gate. The PAL square wave input alternately selects each color dot in sequence.

The output of this gate circuitry is still a square wave. In order to return the square wave to a sine wave, the gate output is fed to low pass filter 13 which in turn is fed to an output jack or other output means 15. The output of the low pass filter which is a phase shifted sine wave, can be monitored on the vectorscope or on a color monitor is sync, burst, etc. is added.

A model of the circuit was tested and found to have phase linearity of better than 2° over the full 360° range. Since the phases track so well, this indicates a linear transfer curve of input voltage level to phase delay. This means the application of a computer generated voltage could accurately produce the same color every time (within 2°).

The generator may also be used with NTSC systems by simply disabling the second phase circuitry. This can be done by removing the PAL square wave, and by grounding the input to the select gate.

It will of course be appreciated that a circuit simply for NTSC (which could not be used in a PAL system) could be produced. This would consist of the elements Q1, U1, 3, 7 and the low pass filter 13. The output of 7 would be fed directly to the low pass filter.

In a practical embodiment, the following commercial elements were used to fabricate the circuit:

| CIRCUIT ELEMENTS | COMMERCIAL PART DESIGNATION | |
|---|---|---|
| Q1 | 2N4124 | MOTOROLA (or eq.) |

| CIRCUIT ELEMENTS | COMMERCIAL PART DESIGNATION | |
|---|---|---|
| U1 | NE527 | SIGNETICS (or eq.) |
| U3, U4, U5, U6, U7, U8 | 74LS123 | MOTOROLA (or eq.) |
| U10, U11, U12, U13, U14, U15 | LM324 | NATIONAL (or eq.) |
| U16, U17, U18 U19. | 74LS00 | NATIONAL (or eq.) |

Although a particular embodiment has been above described, this was for the purpose of illustrating, but not limiting, the invention. Various modifications, which will come readily to the mind of one skilled in the art, are within the scope of the invention as defined in the appended claims.

I claim:

1. In a television color generator, means for phase shifting a sinusoidal sub-carrier input in accordance with a signal of varying amplitude; comprising:
   means for converting said sinusoidal input to a corresponding rectangular wave;
   means for providing said signal of varying amplitude, which amplitude varies in accordance with required phase shift;
   means for varying the pulse width of said rectangular wave in accordance with said signal amplitude;
   said means for converting said sinusoidal input to a corresponding rectangular wave, and said means for providing a signal of varying amplitude, being connected to said means for varying the pulse width of said rectangular wave;
   means for converting said rectangular wave to a square wave;
   said means for varying the pulse width being connected to said means for converting the rectangular wave to a square wave;
   means for converting said square wave to a phase shifted sinusoidal wave;
   said means for converting said rectangular wave to a square wave being connected to said means for converting said square wave to a phase shifted sinusoidal wave;
   whereby said sinusoidal sub-carrier input is phase shifted in accordance with the amplitude of said signal of varying amplitude.

2. A phase shifter as defined in claim 1 wherein said means for varying pulse width consists of at least one basic block, said basic block comprising;
   a one shot multivibrator having an input terminal, a Q terminal, a $\overline{Q}$ terminal, and two timing terminals;
   an operational amplifier having a first input terminal, a second input terminal and an output terminal;
   said $\overline{Q}$ terminal being connected, through an RC network to said one input terminal of said operational amplifier;
   said output terminal of said operational amplifier being connected, through a second RC network, to said timing terminals;
   said means for providing a signal of varying amplitude being connected to said second input terminal of said operational amplifier.

3. A phase shifter as defined in claim 2 wherein said means for varying the pulse width comprises two basic blocks;
   said Q terminal of said one shot of said first basic block being connected to the input terminal of the one shot of said second basic block;
   the Q terminal of said one shot of said second basic block being connected to said means for converting said rectangular wave to said square wave.

4. A phase shifter as defined in claim 3 wherein said means for converting said rectangular wave to said square wave comprises:
   a third one shot multivibrator having an input terminal, a Q terminal, a $\overline{Q}$ terminal, and two timing terminals;
   a third operational amplifier having a first input terminal, a second input terminal, and an output terminal;
   said $\overline{Q}$ terminal of said third one shot being connected, through a fifth RC network, to said one input terminal of said third operational amplifier;
   said Q terminal of said third one shot being connected to said second input terminal of said operational amplifier;
   said output terminal of said third operational amplifier being connected, through a sixth RC network, to said timing terminals of said third one shot.

5. A phase shifter as defined in claim 4 wherein said means for converting a square wave to a phase shifted sinusoidal wave comprises a low pass filter;
   said Q terminal of said third one shot being connected to said low pass filter.

6. A phase shifter as defined in claim 5 wherein said means for converting said sinusoidal input to a corresponding rectangular wave comprises a high speed comparator.

7. In a digital PAL/NTSC color generator, means for phase shifting a sinusoidal sub-carrier input in accordance with a signal of varying amplitude; comprising:
   means for converting said sinusoidal input to a corresponding rectangular wave;
   means for providing said signal of varying amplitude, which amplitude varies in accordance with required phase shift;
   means for varying the pulse width of said rectangular wave in accordance with said signal amplitude, said means for varying comprising a first channel for producing a first PAL phase and a second channel for producing a complementary PAL phase;
   said means for converting said sinusoidal input to a corresponding rectangular wave, and said means for providing a signal of varying amplitude, being connected to said means for varying the pulse width of said rectangular wave;
   first and second means for converting said rectangular wave to a square wave;
   said means for varying the pulse width being connected to respective ones of said means for converting the rectangular wave to a square wave;
   PAL color phase select means for alternately selecting output from said first channel and said second channel and having a first input and a second input;
   said first channel being connected to said first input of said color phase select means and said second channel being connected to said second input of said color phase select means;
   means for converting said square wave to a phase shifted sinusoidal wave;
   said means for converting said rectangular wave to a square wave being connected to said means for converting said square wave to a phase shifted sinusoidal wave;

whereby said sinusoidal sub-carrier input is phase shifted in accordance with the amplitude of said signal of varying amplitude.

8. A phase shifter as defined in claim 7 wherein said first channel comprises at least one basic block comprising:

a one shot multivibrator having an input terminal, a Q terminal, a $\overline{Q}$ terminal, and two timing terminals;

an operational amplifier having a first input terminal, a second input terminal and an output terminal;

said $\overline{Q}$ terminal being connected, through an RC network to said one input terminal of said operational amplifier;

said output terminal of said operational amplifier being connected, through a second RC network, to said timing terminals;

said means for providing a signal of varying amplitude being connected to said second input terminal of said operational amplifier.

9. A phase shifter as defined in claim 8 wherein said first channel comprises two basic blocks;

said Q terminal of said one shot of said first basic block being connected to the input terminal of the one shot of said second basic block;

the Q terminal of said one shot of said second basic block being connected to said means for converting said rectangular wave to said square wave.

10. A phase shifter as defined in claim 9 wherein said second channel comprises at least one basic block consisting of:

a one shot multivibrator having an input terminal, a Q terminal, a $\overline{Q}$ terminal, and two timing terminals;

an operational amplifier having a first input terminal, a second input terminal and an output terminal;

said Q terminal being connected, through an RC network to said one input terminal of said operational amplifier;

said output terminal of said operational amplifier being connected, through a second RC network, to said timing terminals;

said means for providing a signal of varying amplitude being connected to said second input terminal of said operational amplifier.

11. A phase shifter as defined in claim 10 wherein said second channel comprises two basic blocks;

said Q terminal of said one shot of said first basic block being connected to the input terminal of the one shot of said second basic block;

the Q terminal of said one shot of said second basic block being connected to said means for converting said rectangular wave to said square wave.

12. A phase shifter as defined in claim 11 and including a means for converting said rectangular wave to said square wave in each of said first and second channels, each said means for converting comprising:

a third one shot multivibrator having an input terminal, a Q terminal a $\overline{Q}$ terminal, and two timing terminals;

a third operational amplifier having a first input terminal, a second input terminal, and an output terminal;

said $\overline{Q}$ terminal of said third one shot being connected, through a fifth RC network, to said one input terminal of said third operational amplifier;

said Q terminal of said third one shot being connected to said second input terminal of said operational amplifier;

said output terminal of said third operational amplifier being connected, through a sixth RC network, to said timing terminals of said third one shot;

said Q terminal of said fifth one shot multivibrator being connected to said first input of said color phase select and said Q terminal of said sixth one shot multivibrator being connected to the second input terminal of the color phase select.

13. A phase shifter as defined in claim 12 wherein said color phase select gate comprises a first NAND gate having two input terminals and an output terminal, a second NAND gate having two input terminals and an output terminal, a third NAND gate having two input terminals and an output terminal and a fourth NAND gate having two input terminals and an output terminal; means for producing a PAL square wave input;

said means for producing a PAL square wave input being connected to one input terminal of said first NAND gate and said second NAND gate;

said Q terminal of said fifth one shot multivibrator being connected to the second input terminal of said first NAND gate;

said second input terminal of said second NAND gate being connected to said first input terminal of said first NAND gate;

said output terminal of said first NAND gate being connected to one input terminal of said third NAND gate;

said output terminal of said second NAND gate being connected to an input terminal of said fourth NAND gate;

said Q terminal of said sixth one shot being connected to said second input terminal of said fourth NAND gate;

said output terminal of said fourth NAND gate being connected to said second input terminal of said third NAND gate; and said output terminal of said third NAND gate being connected to said means for converting a square wave to a phase shifted sine wave.

14. A phase shifter as defined in claim 13 wherein said means for converting a square wave to a phase shifted sinusoidal wave comprises a low pass filter;

said Q terminal of said third one shot being connected to said low pass filter.

15. A phase shifter as defined in claim 14 wherein said means for converting said sinusoidal input to a corresponding rectangular wave comprises a high speed comparator.

* * * * *